July 3, 1951 L. MICHA 2,559,561

TELEPHONE SWITCHBOARD

Filed June 24, 1948 4 Sheets-Sheet 1

INVENTOR.
Louis Micha
BY
[signature]

INVENTOR.
Louis Micha
BY
Michael S. Striker

INVENTOR.
Louis Micha
BY
Michael S. Striker

INVENTOR.
Louis Micha
BY
[signature]

Patented July 3, 1951

2,559,561

UNITED STATES PATENT OFFICE 2,559,561

TELEPHONE SWITCHBOARD

Louis Micha, Monaco, Monaco

Application June 24, 1948, Serial No. 34,938
In France July 7, 1947

12 Claims. (Cl. 179—27)

This invention relates to telephone switchboards for central battery and automatic systems, and more particularly to switchboards serving to interconnect a limited number of local stations to a small number of trunk lines as well as to serve as an exchange board for the intercommunication of the respective local stations.

In the case of small private branch exchanges, usually comprised of a number such as ten local stations which are to be interconnected as well as brought into communication with, say, three outside or trunk lines, it is sometimes desirable to prevent certain manipulations of the switchboard by the operator in respect to the privacy of the various talking circuits and to limit the number of local lines which may at any one time be connected to any of the trunk lines.

In switchboards, as known heretofore, constructions incorporating so-called lever-type controls for the connection-making-functions and for insuring the above desired objects, difficulties have been encountered due to the multiplicity of contacts which become necessary in order to provide the regular connections.

It is an object of the present invention to provide a switchboard of the type referred to above which greatly simplifies the construction for the purpose stated.

It is another object of the invention to provide a switchboard the various functions of which are controlled by a limited number of push buttons which are associated with the respective trunk and local circuits.

It is a further object to provide a switchboard which lends itself to a predetermined limitation of the use of the local lines by the provision of a switching control through the medium of push buttons having electro-mechanical limitation means in the form of pull cord limiters associated therewith.

In accordance with certain features of the invention, a standard electrical circuit, serving to control the connections, for example, of three trunk lines and ten local lines, is provided with a manual control in the form of push buttons for the respective circuits or lines for activation of the associated relays thereby. The push buttons, in addition, serve to actuate a combination of pull cords and a system of pulleys which, in turn, control the rotation of cams acting to open and close circuit switching contacts whereby the use of the respective associated circuits may be limited in any desired manner.

In accordance with other features of the invention, means are provided in the switchboard whereby a given number of the local lines may be reserved entirely for local, that is, inter-communication use, without access to any outside trunk lines. This provision is obtained by means of so-called change-over bars which serve to impose, in combination with the said circuit limiters, the desired limitation upon the circuits affected.

In practice, the switchboard may be energized by a common form of telephone battery, the positive side of which may be grounded to the metallic body of the board.

These and other features and objects will become more clearly apparent as the invention is described in more detail with reference to the accompanying drawings, in which:

Figs. 7 and 7*a* are schematic diagrams of the electrical circuit for the switchboard, shown on two sheets.

When referring to the various drawings, the same elements will be indicated by the same reference characters.

Figures 2, 3:
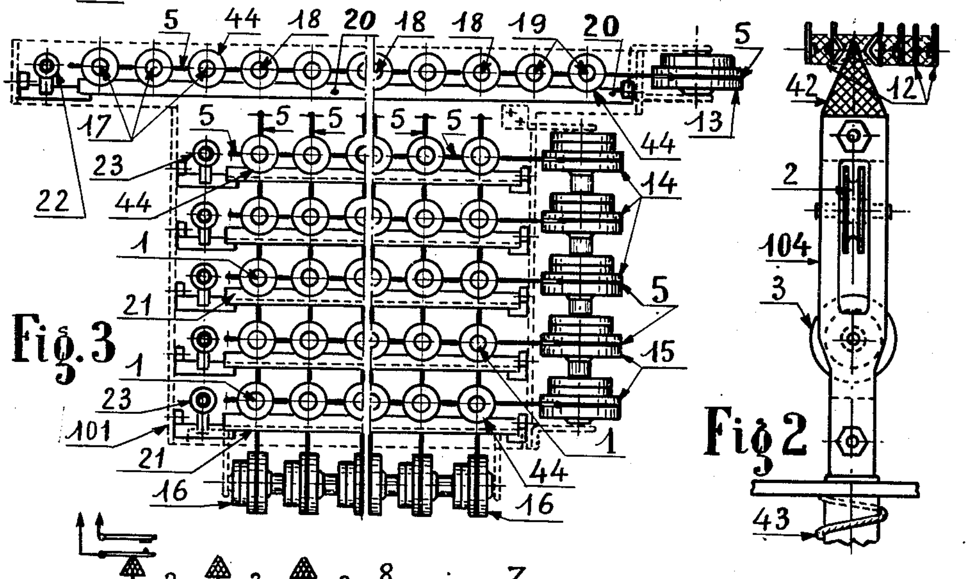
Fig. 2 is an illustrative representation of certain mechanical details of the push button and pulley arrangements of the control shown in Figure 1.
Fig. 3 is a schematic representation of the panel of the switchboard, showing the arrangement of the control buttons and the limiters.
Figure 1:
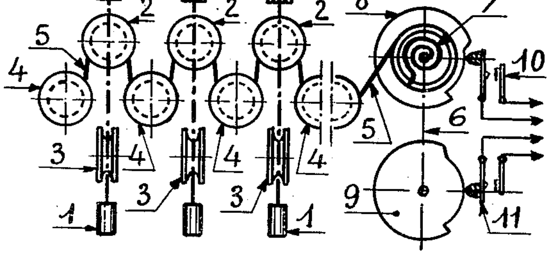
Fig. 1 is a schematic representation of a combination of a number of push buttons and pull cord circuit limiters in accordance with the invention.

Viewing first the schematic showing of Figure 1, it will be seen that the switchboard panel has been provided with a plurality of push buttons 1 for effecting certain control functions with respect to the various electrical circuits, by their in- and outward-movement, as will become apparent hereinafter. The extension rods 104 of these buttons, as shown in Figures 1 and 2, have mounted thereon guiding members such as pulleys 2 and 3, disposed at right angles to one another. These two pulleys form parts of two different circuit limiters, as will be explained. An additional series of guiding members such as pulleys indicated at 4 and secured to the frame behind the panel, form with pulleys 2 a single limiter system, their plane of reference being parallel to that of the sheet. A flexible member such as a pull cord 5 is shown to run over alternate pulleys 2 and 4 associated with successive control buttons 1. One of the pulleys 4, shown on the extreme left in Figure 1, which is secured in a non-rotating position, has fixed thereto one end of the cord 5, the other end of which is wound about the cylindrical surface of an element such as a drum, as shown at 13, 14, and 15, and mounted on a fixed shaft 6. The drum, as for instance shown in Figure 1, has fitted thereon a spiral spring 7, one end of which is fastened to shaft 6, while the other end is anchored on the drum, whereby the pull cord 5 is maintained under tension. The function of the spring 7 is to maintain the cord 5 within the grooves of the pulleys 2 and 4 as well as to tend to rotate the drum to its rest position after actuation of any of the buttons 1. It is evident that upon one of the buttons 1 being depressed, the respective pulley 2 will undergo a translational motion in the same direction, thereby exerting a pull on the cord 5 and effecting a rotation of the drum to which the cord is anchored, against the force of the spiral spring. Since the degree of rotation of the pulley 4 will be the same in each case, it is possible by the provision of cam surfaces 8 and 9 on the respective drums to obtain a predetermined control sequence of the opening and closing of associated circuit contacts 10 and 11. The second cam 9 is provided on all of the drums except the one associated with the operator's service circuit shown at 13 in Figure 3. The latter cam 9 and the contacts 11 serve to control mistaken and undesired operations on the board. The arrangement is such that contacts 11 may be closed or opened by the cam 9, after the closing or opening, due to the first turn of the drum, of the circuits controlled by contacts 10. The contacts 11 will become operative at the beginning of the second turn when a connection is made of a local line with respect to the trunk, while the same contacts will operate only after the second turn in case of a connection with another local station.

Figure 2 also illustrates how the insulated tip 42 of the push button extension 104 serves to act on contacts 12 which control the junction of the local lines with respect to the inter-communication circuits.

From the above, the analogy of the functions of pulleys 3 and other pulleys 4 in the same plane of reference may be visualized in connection with other circuit limitation systems acting at right angles to the systems defined by pulleys 2 and 4 referred to above.

It is thus seen that each of the communication controlling push buttons 1 comprises a crossing point for the pull cords of two circuit limiters, one of which controls the telephone circuit while the other controls the local line associated therewith.

Figures 4, 5:
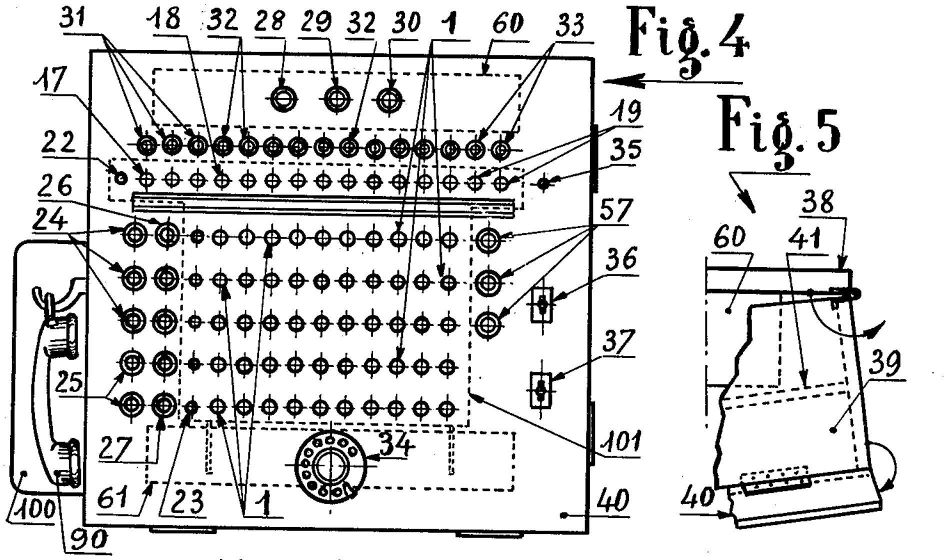
Fig. 4 is a view in elevation of the front of the switchboard.
Fig. 5 is a constructional detail of the board shown in Figure 4.

The arrangement of the various control buttons is shown in the panel represented in Figures 3 and 4. Ten columns of the control buttons 1 may be distinguished, each of the columns including three push buttons corresponding to the three trunk lines and the two buttons which correspond to the two local talking circuits. Figure 3 also serves to illustrate the mutually perpendicular arrangement of the respective pull cords and the associated groups of drums, 14 and 15 to one side, the drums 16 at the bottom of the panel, the operator's circuit drum 13 being separately arranged. The respective sets of drums are mounted on three separate shafts. As already brought out, the drum 13 is equipped with a single cam in contrast to the others which possess two such cams. Of the drums, respectively associated with the horizontally disposed pull cords, in accordance with Figure 3, those indicated at 14 and 15, respectively, control three trunk circuits and two local talking circuits, while the drums indicated at 16 have control over the local lines of which a number may be reserved for local inter-communication use exclusively. It will be seen therefrom that except for the circuit limiter 13, the limiters are paired off in a mutual relationship.

For the size of switchboard which is being considered, the operator's circuit will include fifteen control buttons in one row, where 17 indicates the three buttons for the control of the trunk lines, 18 the ten buttons for the local lines, and 19 the two buttons for the two inter-communication circuits. The requirement for privacy makes it imperative that the operator may not break in on the inter-communication circuits except as requested.

There may also be seen in Figure 3 the holding latches 20 and 21 for the control buttons which extend across the width of the board of the panel and which serve to maintain the control buttons in an operated position. The release of the buttons is mutually effective, that is to say, each of the buttons in a given horizontal row will serve to release any other. In addition, the release of a single retained button is obtained by means of the release button 22 for the operator's circuit and by means of the five release buttons 23 for the five communication circuits.

The wall-type switchboard panel shown in Figure 4, in a representative embodiment, includes in its central portion:

50 white inter-communication buttons 1,
5 release buttons 23 for the first named buttons,
5 white visual signals 24 and 25 indicating the end of conversation respectively for the three trunk circuits and the two inter-communication circuits,
5 yellow visual signals 26 and 27 indicating the use of the three trunks and the two local circuits,
3 green visual signals 57 indicating the supervision of the three trunks.

In the lower portion:

3 visual signals 28, 29, 30 for indicating incoming calls, the end of conversations and calls on the inter-communication system, these signals being respectively red, white and blue,
13 red visual signals 31 and 32 for incoming calls on the trunk and local circuits,
2 blue visual signals 33 for indicating a call-back on the local circuits,
15 service buttons in red, white and blue indicated at 17, 18, and 19,
1 release button 22 for the buttons just referred to.

In the center of the lower portion: the dialing disc 34.

Figure 7:
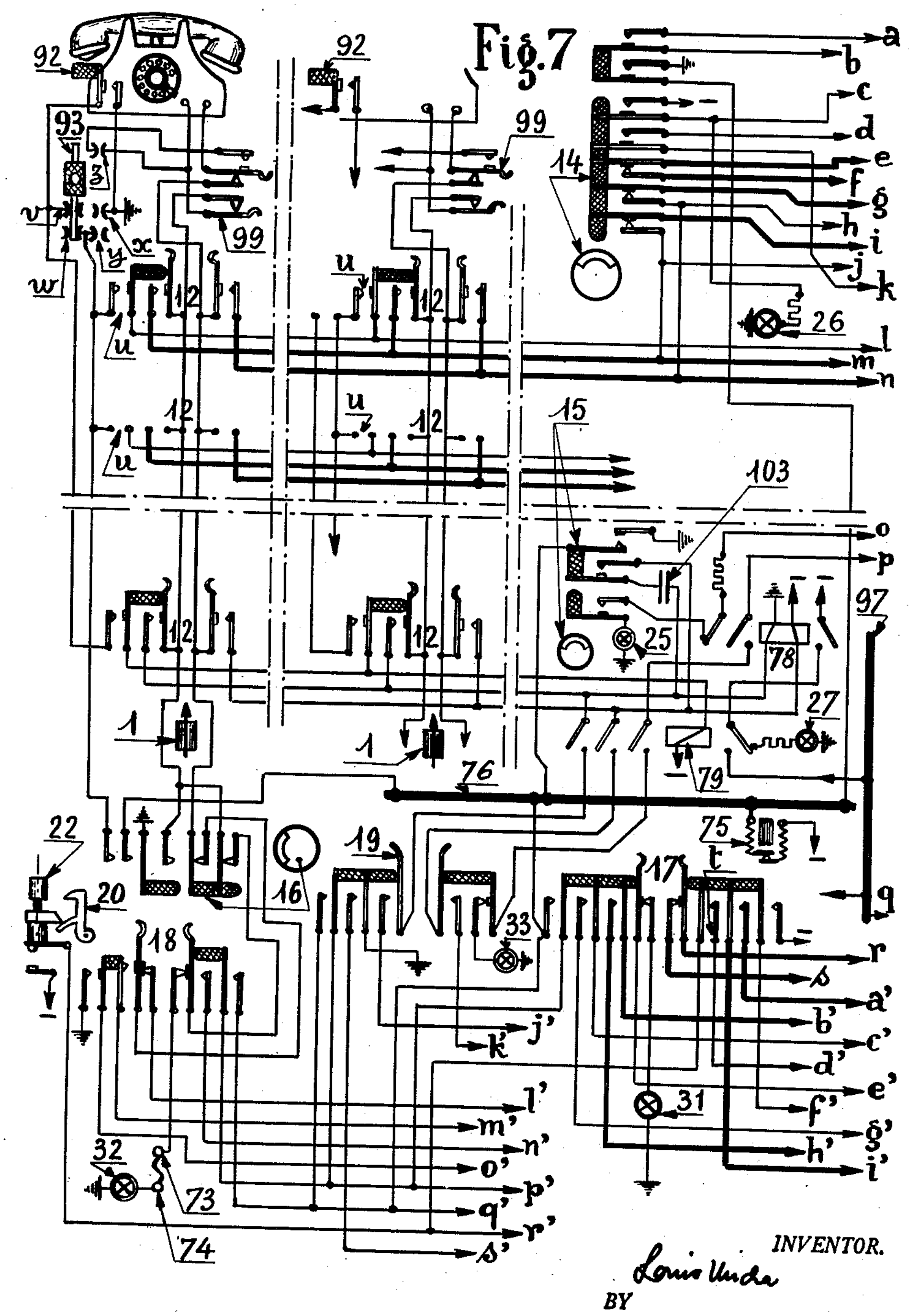
Figure 7:
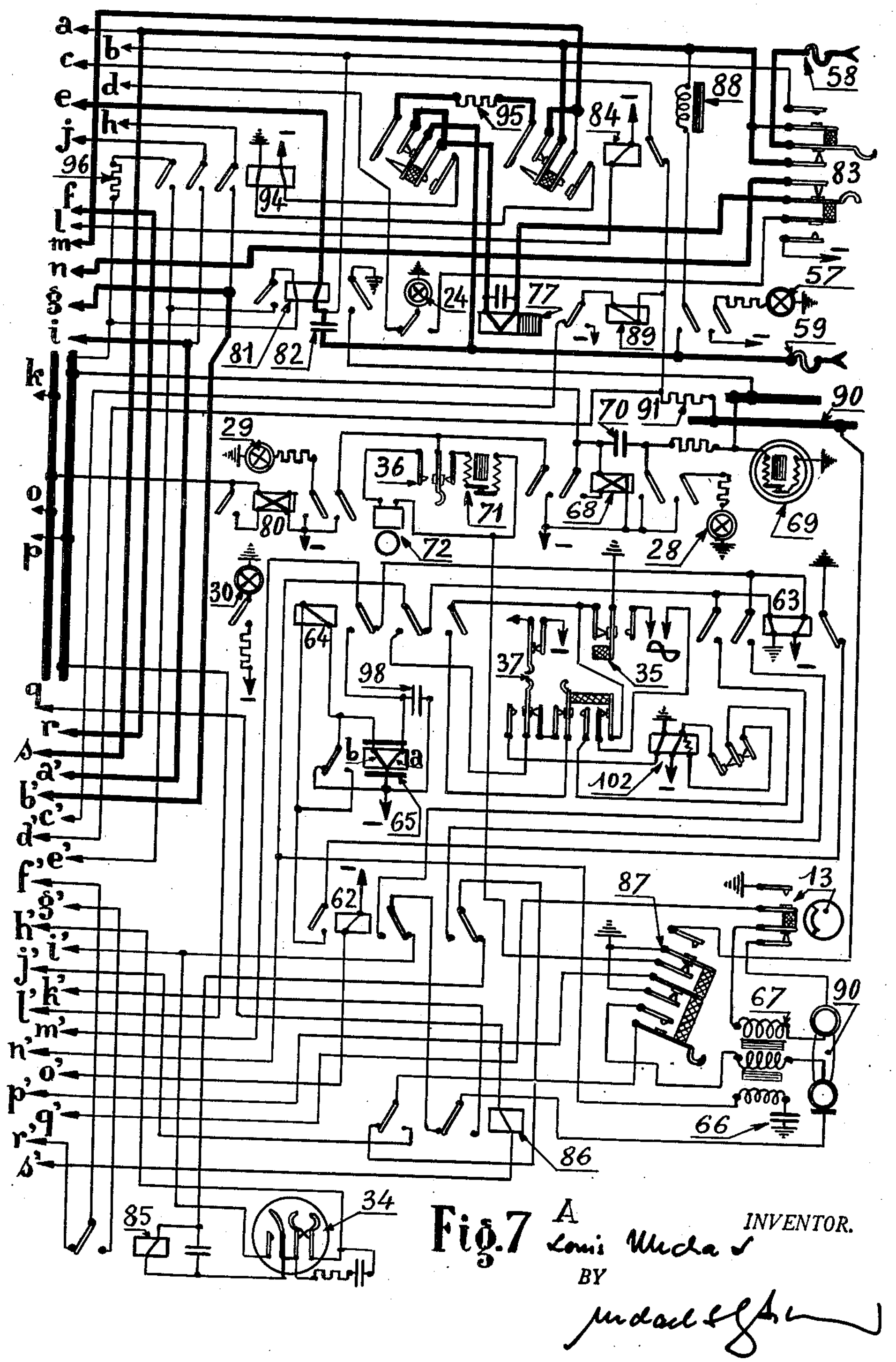

On the right, from top to bottom:

1 white button 35 for calling the local lines,
1 change-over key 36 for changing from the buzzer to the bell whenever the operator has to leave her post for a period,
A two-way key 37 for changing over in one position from alternating current to the vibrator relay supplied from the battery for station ringing, and in the second position for cutting off the negative polarity on all circuits except the jacks 83 which are provided for making direct connections, as shown in the second portion of Figure 7.

Figure 5 illustrates the manner of opening the panel. The panel construction includes the base 38, the body 39, and the panel 40, the connection between the three portions being provided by hinges. In the drawings, the embodiment of the switchboard is shown as constructed of wood but may just as well be of metal.

Figure 6:
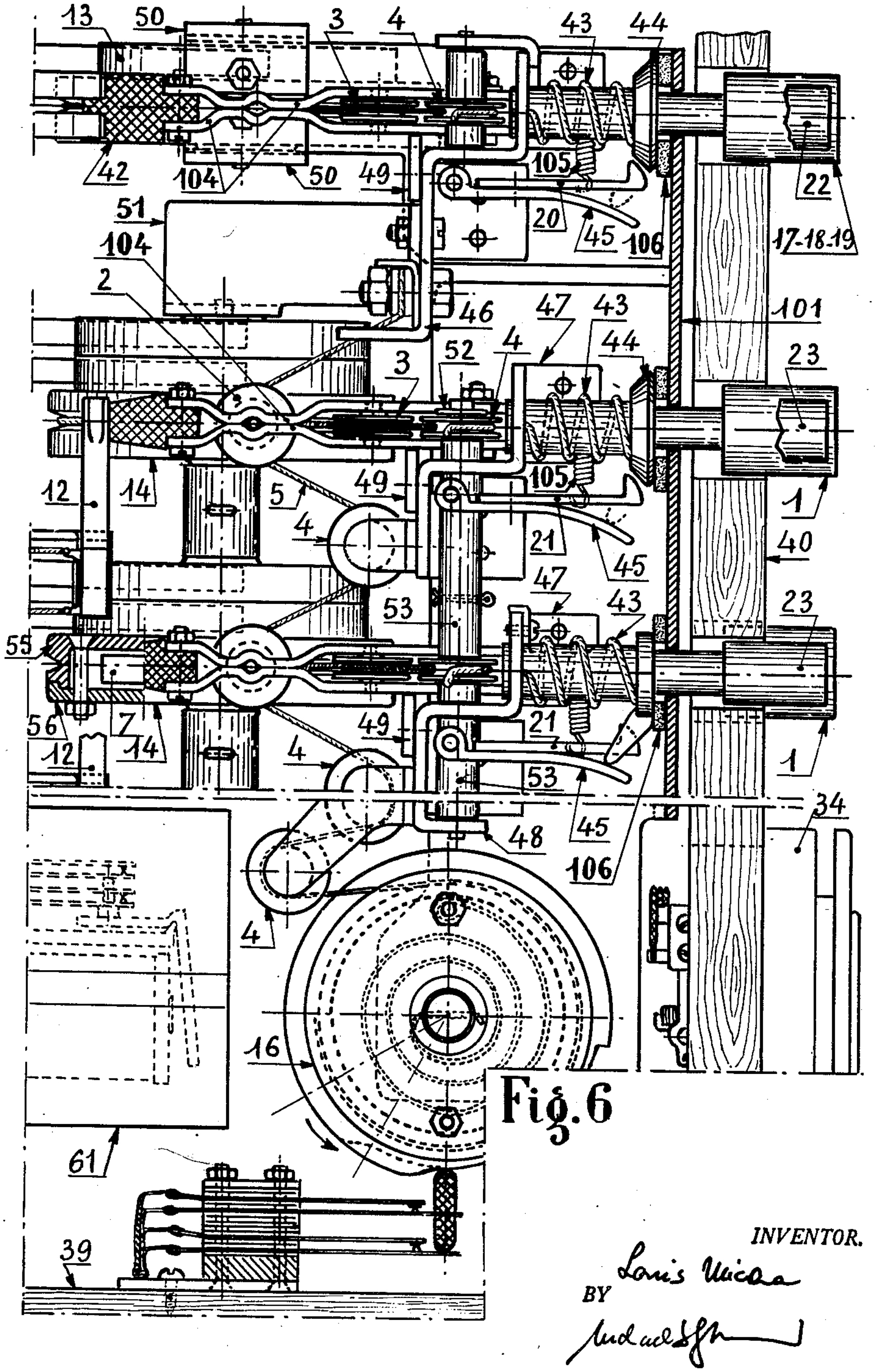
Fig. 6 is a view in elevation of a cross section through the switchboard panel and the mechanism mounted therebehind.

The elevational sectional view of the panel control mechanism, as shown in Figure 6, does not make a complete showing of the contacts which are controlled by the buttons and the cam surfaces. At the bottom of the figure, mounted on the body 39, there may be seen a block of contacts controlled by the drum 16 of a local line, the associated pull cord of which is seen extending upwardly in a zigzag fashion. In this figure, there may also be discerned the contacts controlled by the horizontally disposed cams of the circuit limiters 13, 14 and 15, their outline being visible in broken lines. Each of the control buttons has an extension 104, as already referred to, which carries pulleys 2 and 3 and terminates in an insulated point 42, the said extensions also being provided with the stopping flange 44 and a return or pull-back spring 43. The flanges 44, upon being pushed forward by a depression of the buttons, will co-act with the latch members 20 and 21, respectively, for holding the button in an operated position. These latter are subject to pull-back tension due to return springs 105. Each of the latching pieces 20 and 21 is provided with a disengaging element 45 which is actuated by depressing the disengaging buttons 22 or 23. A rubber gasket 106 between the flanges 44 and the panel serves to cushion any mechanical shock. The chassis 101 within the panel is reinforced in the lateral sense by means of six cross pieces as indicated 46, 47, and 48 permitting the passage therethrough of the button extensions which are prevented from turning about their axis due to the provision of a stop member 49 on each of the cross pieces. The shaft of the limiter drum for the operator is carried between the two square pieces 50, bolted to an extension of the chassis 101. Similarly, the limiter drums 14 and 15 for the talking circuits have their shafts mounted between the two double squares 51, only one of which is shown.

The pulleys which are arranged in horizontal and vertical columns spaced at equal intervals from one another and from the translation pulleys, are being held in alignment by means of tubular members mounted on the pulley shafts. A resilient stop 52 serves to secure and to maintain each of the vertical pulley columns on the upper part of the shaft. Small cotter pins, which extend through the drum shafts, prevent the turning of the alignment tubes 53 and 54. The cross piece 48 differs from the other pieces in that it is provided with a horizontally appearing extension which serves to support the assembly of the tubes on the vertical axis of the fixed and horizontal pulleys. The same arrangement has been provided for the shafts and horizontal tubes of the vertical pulleys which have been arranged along the cross pieces 47 and 48 associated with the drum 16. The larger diameter tubes which separate the drums 14 and 15 as well as those which separate the drums 16 of the intercommunication system are similarly held in place by means of cotter pins. Each of the drums are comprised of a box portion 55 and a cover 56 which may be of molded material. The diameters of the grooves in the drums will differ in accordance with the number of buttons controlled by the respective drums, such diameter corresponding to at least 5+1, 10+2, or 15+2 as required, respectively, for the local lines, the talking or service circuits, while the number of turns required for the authorized operations may not exceed one or two. The operation of the two cams on the drum 16 may be perceived from the showing of the lower part of Figure 6. Thus, the cam surface on drum 16 shown in broken lines, behind the cam facing the observer, will actuate a second block of contacts (not shown), upon the depression of a second communications control push button associated with the same local line. The cross piece 46 carried bolts for stopping the cams of the local line limiters 16. The contact blocks for the service buttons 17, 18, and 19 are arranged in two horizontal rows, one above the other, while the intercommunication contacts 12, of which three are provided for each button, are disposed in a single vertical row, two contacts being arranged on one side of the insulated portion 42 for control thereby, another contact being provided on the other side of portion 42.

Of the two release buttons 22 and 23 only the release member 22 is provided with an insulated end 42. The contact springs which are controlled by the last named insulated portion and which are indicated schematically in Figure 7 are disposed in alignment with those of the operator's or service buttons.

In the schematic showing of the electrical circuits on the two sheets of Figure 7, the continuity of the wiring may be traced with the aid of corresponding small letters of the alphabet. Only a single trunk line has been illustrated, its terminals being shown at 58 and 59. In addition, Figure 7 includes the service button 17 for the said trunk line and the controlling push button 18 corresponding to a local line; this would be the first button in the service row on the panel, corresponding to a single trunk and a single local communication circuit. The relays of the circuit are arranged in two rows on the base 38 and protected by two covers 60 and 61 which may be seen in Figures 4, 5, and 6.

The limiters, in this case, are identified by the same reference numerals as the drums, and the limiter contacts are shown schematically arranged in one row, the ones which become operative due to an error on the operator's part being disposed farthest away from the circular symbol denoting the cam. The contacts 12 are under the control of push buttons 1.

The following ten operations will serve to illustrate and explain the working of the circuits and their controls:

(1) The operator calls a local station: He will push the service button 18 corresponding to the station and intermittently work the call button 35. The following connections are activated:

(*a*) Positive ground on button 18; switch-over relay 62; negative terminal of the battery.

(*b*) Positive ground on a contact of the feeding relay 63; working contact of the relay 62; call control relay 64; negative on battery.

(*c*) Positive ground on call button 35; second position of the two way key 37; working contact of relay 64; working contact of button 18; the line of the called station connected by means of the limiter 16 associated with the said line; return over a working contact on 64; condenser 98 shunting the winding *a* of the call-interrupting relay 65; negative on battery.

Upon the receiver of the called station being lifted, the call-interrupting relay 65 permits the relay 63 to be energized upon the release of the relay 64 by closing the circuit from the station to the operator on the service circuit and to prevent the re-excitation of relay 64. The use of this self-interrupting call serves the purpose of preventing the sending out of the call into the talking circuits. The supervision of the call is both visual, and by means of the visual signal 30 as well as auditory due to the action of the calling current on a small condenser 66 in series with an induction coil 67 at the operator's station. An auxiliary signal may be obtained by the vibrator relay 102 with the aid of the key 37.

(2) A local station calls the operator, by lifting the receiver: Positive ground on the visual signal 32 and the calling line over button 18 and the limiter 16; call pilot relay 68; negative on battery.

The visual pilot signal 28 will be energized at the same time as the buzzer 69, the latter being muffled by the small condenser 70. The operator is apprised of the calls and the termination of the calls by means of the buzzer 71 and the bell 72. Upon hearing the buzzer 69, the calling party knows that he will hear another calling party. When the operator is not obliged to respond to another call, he will release the service button by operating the release 22. In the case that the operator hangs up, any service button in the operated position will energize the buzzer 75 from a supply line 76 to indicate an operative error.

(3) A local station asks to be connected to the outside line: The operator depresses the intercommunication button 1 of the calling station in respect to an open trunk line, thereby causing the limiter 16 of the calling line to make one turn. The limiter 14 corresponding to the used trunk line also advances by a turn. The first turn of the limiter 16 cuts off the local station from its calling circuit and from the operator, while the first turn of the limiter 14 energizes the visual "busy" signal 26 of the trunk line and prepares the indication of the end of the conversation over the non-operated contact of the supervisory relay 77, which is non-responsive to the dialing impulses. The latter relay serves to provide the energization for the supervisory signal 24 upon its release, whereupon the operator clears the circuit.

(4) A local station puts in a call for another local station: The operator calls the requested party, after making the connection over the service button of the calling party to the service button of the called party, through the medium of the call button 35. As the response comes in, the operator connects the two local lines to a free local intercommunication circuit by simultaneously pushing in the two corresponding intercommunication buttons 1. As a result, the feed relay 78 of this free circuit will energize the "busy" signal 27 over a contact of the local intercommunication circuit call-back relay 79. The limiter 15 of the said local circuit will be given two turns, whereby the indication of the end of the conversation for which the stage has been set after the first turn, will come about upon release of the relay 78 when the two local stations have hung up.

The operative connections in this case are:

Positive ground on the signal 25; the working contact on limiter 15; contact of the relay 78 a rest; termination relay 80; negative on battery.

(5) A call coming in from an outside line: The call relay of the calling trunk line is energized:

The connections are:

Terminal 59 of the line; condenser 82; relay winding 81; contact at rest of limiter 14; contact at rest of the service button 17; the jack 83; terminal 58 of the line.

The call relay will warn the operator as follows:

Positive ground on the call signal 31; contact at rest of the button 17; contact and winding of the call relay 81; pilot call relay 68; negative on battery.

Upon depression of button 17 by the operator:

Terminal 59; unoperated contact of relay 84; relay 77; jack 83; unoperated contact of the limiter 14; operated contact of button 17; pulsing contacts of the dial 34; supervision control relay 85; unoperated contacts of relay 62 and the admission relay 86; the hook of commutator 87; the operator's station; the unoperated contacts of the relays 86 and 62; operated contacts of button 17; unoperated contact of limiter 14; unoperated contact of relay 84; jack 83; terminal 58 of the trunk.

Thereby, the relays 77 and 85 are energized and protective self-inductance 88 is connected to the line over a supervising relay 89.

The connections made are:

Positive ground on the hook 7; supply line 90; resistance 91; relay 89 and the energization contact thereof; the operated contact of button 17; the operated contact of relay 85; the negative on the battery on button 17.

The relay 89 holds one of its contacts and establishes the following supervision:

Terminal 59; operated contact of relay 89; self-inductance 88; jack 83; terminal 58; the supervisory call signal 57 is energized; positive ground on the signal 57; operated contact of relay 89; negative on battery.

(6) An outside call is received for a local station: After having responded as above (5), the operator calls the requested party on his button 18 which permits the release of button 17 for the trunk line involved. The called party thereupon lifts his receiver, and the connection with the calling line is established without supervision by depressing the intercommunication button 1 associated with the called line. As a consequence, the first turn of the limiter 14 causes a release of the relay 89 by applying negative polarity between the relay 89 and the resistance 91. In order to satisfy the requirements of privacy and supervision, the following connections are made:

Interruption of the operator's extension on limiter 14; the making of contacts 12 by the intercommunication button 1; and the application of the negative polarity on 16.

(7) Successive supervision: Except for the action of the release 22, supervision is eliminated as soon as the operator hangs up or upon a connection being made between the calling trunk and a local line. Thus, the operator may change from one trunk to another while maintaining a successive supervision. In the case that during other operations, the incoming trunk line call should not go beyond the operator, he would not hang up as this would cause all of the indicators to be thrown up at the same time. The proper operation would be to depress the button of the line which is to be cleared and to operate the release 22 which causes a negative polarity to be applied between resistance 91 and relay 89 before the button has been released from the retaining latch 20. The relay 89 becomes energized thereby. During the release of button 17, the contact t should be the last to be released so as to avoid the possibility of reenergizing the supervisory relay 89 over the operated contact of control relay 85.

(8) The operator calls an outside line: As before, the supervisory control relay 85 will cause the excitation of the supervising relay 89. Every time that the operator works the dial, the rapid action relay 85 is short circuited together with the operator's station. Upon calling back, the relay 85 will short circuit the quick action relay 89, which in turn falls back before the transmission of the dial impulses takes place. The two last named relays will fall back even during the very brief interval which elapses between the dialing of the first numeral and the return of the dial, provided that the dial contacts touch one another just as soon as the disc begins to turn. At the beginning of each of the pulse trains the supervision control relay 85 is re-energized with a subsequent operation of the supervisory relay 89.

(9) The operator is called back from a local station connected with an outside trunk:

Whenever a local station is equipped for calling back, it is theoretically connected over four wires. However, since the switchboard is grounded, one of these wires may be replaced by a ground connection. As a matter of fact, one of the lines may be replaced by the lead sheath of a three wire cable. It will be seen, therefore, that the call-back cannot originate from stations connected by two lines. A button or key 92 provided on the local telephone may be used to establish contact between the lead sheath of a three wire cable with the third or call-back wire of the said cable. This wire leads to the operated contact *u* of the row of contacts associated with button 1 of the local line having two branch conductors. One of these branches leads to the contacts *u* associated with the local circuits and the other one to the contacts *u* associated with the trunk circuits by way of a change-over bar 93 which consists of two portions insulated one from the other. Since the call-back wire connects with the selection and call-back relay 84, the corresponding intercommunication button 1 having been depressed, the local calling party only has to operate the button 92 in order for the relay 84 to return the circuit to the operator. It now becomes apparent that the trunk circuit is transformed into a local circuit which is supplied from the relay 94 and that the line automatically becomes supervised by the resistance 95. At the same time, relay 94 energizes the visual signal 31 over the resistance 96 and the call control.

Two possible connections with respect to a local station will now be discussed:

*First case.*—Connection to a second trunk line. By depressing the button 17, after the relay 84 has been interrupted the negative maintaining at rest the relay 89 which was activated by the limiter 14, the relay 89 becomes re-energized. The operator may now make a connection on button 17 with another free trunk line or simply connect this line with the call-back party by actuating the corresponding button 1.

*Second case.*—Connection with a local line. The operator, having received the call on button 17, will call the requested party on his button 18. The two parties may be given one of the free intercommunicating circuits, such as the one shown. The return call-back, accordingly, takes place over a local intercommunication circuit as follows:

(10) Call-back of the operator from a busy local line over a local intercommunication circuit: The operation of button 92 energizes the relay 79, energizing the visual call-back signal 33 on the local communication circuit as well as the call control relay 68. The relay 86 gives the operator the opportunity to make a connection with the circuit by depressing the button 19 which serves this function exclusively.

The connections are:

Positive ground on button 19; feeding relay 86; main supply line 97; operation of relays 79 and 78; negative on battery.

A temporary connection will then be established as outlined above.

The general privacy of the conversations is brought about in the following manner:

First of all, the interruption of the negative supply through the key 37 which will prevent the operation of the selection and call-back relay 84 which functions to separate any tie-ins, will result in the prevention of any listening-in. Then, if the negative should not be interrupted, any undesired operation is rendered ineffective and is indicated by the special buzzer 75. The buzzer may not be put out of action by any of the following undesired operations:

(*a*) If more than one inter-communication button 1 is depressed for the same local line, the corresponding limiter 16 would not only provide an interruption on this line but, if at least one of the depressed buttons corresponds to a trunk line, this local line would be immediately disconnected from the trunk and put under supervision over the resistance 95 due to the energization of relay 84 when the key 37 is at rest. The connections are: Positive ground on limiter 16; service contact of the depressed button 1; selection and call-back relay 84; negative on battery.

(*b*) If more than one service button is depressed: The operator's receiver is cut off by the service limiter 13 and an indication by error buzzer 75 takes place as above.

(*c*) Should more than one communication button be operated with respect to the same trunk line, the limiter corresponding to this trunk will act to smother the conversation on the call condenser of the trunk line:

Terminal 59; condenser 82; contact on limiter 14; jack 83; terminal 58.

(*d*) If more than two intercommunication buttons are depressed for the same local inter-communication circuit, the circuit will be rendered ineffective over the condenser 103 mounted on the corresponding limiter 15.

(*e*) There is no possibility of a cross-over between two intercommunication circuits except over the open connection established by the limiter 16 when two buttons of the same local line are operated, as the two circuits will be rendered ineffective and an indication is given on buzzer 75.

The change-over of the so-called supplementary lines, that is those which may be connected to the outside, into lines for local inter-communication use only and vice versa may be obtained in the following manner (see Figure 7):

Reference is had to the change-over bar 93 held between the clamping jaws *v* and *w*, and which is represented as applied to the so-called supplementary lines. When the lines are to be used for intercommunication only, the member 93 connects the ground clamp *x* to the clamp *y*. Thus, positive polarity is at once applied to the service wire of the trunk line when an attempt is made to connect the trunk with an inter-communication line by depressing the intercommunication button. As a consequence, the relay 84 becomes energized and causes a separation of the main line from its circuit. By changing the position of the bar 93, no change is effected in the functioning of the circuits for obtaining a call-back of the operator nor with respect to the privacy of the local talking circuits. Since these change-over bars are made of two pieces disposed along one axis, are of different lengths and are insulated one from the other, it will be impossible to insert bar 93 incorrectly due to the corresponding distances between the clamping pieces *x*, *y* and *z*.

The direct connection of any of the trunk lines with any one of the supplementary lines may be effected quite simply by means of plug cords. Consequently, three short double conductor cords with a double plug are provided, the plugs and trunk line jacks 83 being larger than the plugs and jacks for the local lines 99. These jacks are arranged in a single row and are disposed underneath the rubber covered front surface 100 of the panel which may be seen in Figure 4, just behind the operator's telephone set 90.

The total number of the jacks will be 3+10+3=16, including three large dummy jacks. Any trunk line may at any time be connected directly, the visual signal 24 indicating a conversation on the connection, as may be seen by tracing the operated contact of relay 77. This indication will take place without any accompanying audible signal. It is for this reason that the key 37 cuts off all connections to the negative polarity except on the direct connection jacks 83. Thus, the operation of the switchboard may be either partial or whole, it being still impossible to connect a line functioning exclusively as a local inter-communication line to a trunk line in view of the fact that the change-over bar in the intercommunication position makes contact with the two clamping pieces *z*. As a matter of fact, an open connection would be introduced under these circumstances by the local line jack if an attempt were made to connect the intercommunication line with an outside trunk by means of a plug cord.

Due to the concept of the circuit limiters as described hereinabove, the number of the telephone relays adduced in the above description for the 3+10 type switchboard has been reduced to twenty-eight, that is an average of about two relays per line.

Although a specific embodiment of the present invention has been illustrated and described, it is to be understood that the various changes may be made without departing from the spirit and scope of the invention, and such changes are contemplated.

What I claim as new and desire to secure by Letters Patent is:

1. A telephone switchboard having a plurality of push buttons arranged in horizontal rows and vertical columns for making connections between lines, comprising in combination, a frame rigidly secured to the switchboard; stationary guiding members arranged in line to one another in said frame; movable guiding members, each connected to one of the push buttons, respectively, said movable guiding members being arranged in line to one another in the same plane with said stationary guiding members; a flexible member connected with one end thereof to said frame and arranged in a zig-zag path embracing said guiding members; and an element adapted to take a plurality of positions for controlling connections between the lines and being connected to the other end of said flexible member, whereby by the pushing in of a push button said movable member connected therewith is displaced and the effective length of said flexible member is increased so that said element changes the position thereof.

2. A telephone switchboard having a plurality of push buttons arranged in horizontal rows and vertical columns for making connections between lines, comprising in combination, a frame rigidly secured to the switchboard; stationary guiding members arranged in a horizontal row in said frame; movable guiding members, each connected to one of the push buttons arranged in a horizontal row, respectively, said movable guiding members being arranged in a horizontal row in the same plane with said stationary guiding members; a flexible member connected with one end thereof to said frame and arranged in a zig-zag path embracing said guiding members; and an element adapted to take a plurality of positions for controlling connections between the lines and being connected to the other end of said flexible member, whereby by the pushing in of a push button said movable member connected therewith is displaced and the effective length of said flexible member is increased so that said element changes the position thereof.

3. A telephone switchboard having a plurality of push buttons arranged in horizontal rows and vertical columns for making connections between lines, comprising in combination, a frame rigidly secured to the switchboard; stationary guiding members arranged in a vertical column in said frame; movable guiding members, each connected to one of the push buttons arranged in a vertical column, respectively, said movable guiding members being arranged in a vertical column in the same plane with said stationary guiding members; a flexible member connected with one end thereof to said frame and arranged in a zig-zag path embracing said guiding members; and an element adapted to take a plurality of positions for controlling connections between the lines and being connected to the other end of said flexible member, whereby by the pushing in of a push button said movable member connected therewith is displaced and the effective length of said flexible member is increased so that said element changes the position thereof.

4. A telephone switchboard having a plurality of push buttons arranged in horizontal rows and vertical columns for making connections between lines, comprising in combination, a frame rigidly secured to the switchboard; first stationary guiding members arranged in a horizontal row in said frame; first movable guiding members, each connected to one of the push buttons arranged in a horizontal row, respectively, said first movable guiding members being arranged in a horizontal row in the same plane with said first stationary guiding members; a first flexible member connected with one end thereof to said frame and arranged in a zig-zag path embracing said first guiding members; a first element adapted to take a plurality of positions for controlling connections between the lines and being connected to the other end of said first flexible member; second stationary guiding members arranged in a vertical column in said frame; second movable guiding members, each connected to one of the push buttons arranged in a vertical column, respectively, said second movable guiding members being arranged in a vertical column in the same plane with said second stationary guiding members; a second flexible member connected with one end thereof to said frame and arranged in a zig-zag path embracing said second guiding members; and a second element adapted to take a plurality of positions for controlling connections between the lines and being connected to the other end of said second flexible member, whereby by the pushing in of a push button said movable members connected therewith are displaced and the effective lengths of said flexible members are increased so that said elements change the positions thereof, respectively.

5. A telephone switchboard having a plurality of push buttons arranged in horizontal rows and vertical columns for making connections between lines, comprising in combination, a frame rigidly secured to the switchboard; first stationary guiding members arranged in a plurality of horizontal rows in said frame; first movable guiding members, each connected to the push buttons, respectively, said first movable guiding members being arranged in a plurality of horizontal rows in the same planes with said first stationary guiding members, respectively; first flexible members connected with one end thereof to said frame and arranged in a zig-zag path embracing, respectively, said first guiding members arranged in a horizontal row; first elements each being adapted to take a plurality of positions for controlling connections between the lines and being connected to the other end of said first flexible members, respectively; second stationary guiding members arranged in a plurality of vertical columns in said frame; second movable guiding members, each connected to the push buttons, respectively, said second movable guiding members being arranged in a plurality of vertical columns in the same planes with said second stationary guiding members, respectively; second flexible members connected with one end thereof to said frame and arranged in a zig-zag path embracing, respectively, said second guiding members arranged in a vertical column; and second elements each being adapted to take a plurality of positions for controlling connections between the lines and being connected to the other end of said second flexible members, respectively, whereby by the pushing in of a push button said two movable guiding members connected therewith are displaced and the effective lengths of said two flexible members embracing said two movable guiding members, respectively, are increased so that said two elements connected to said two flexible members, respectively, change the positions thereof, respectively.

6. A telephone switchboard having a plurality of push buttons arranged in horizontal rows and vertical columns for making connections between lines, comprising in combination, a frame rigidly secured to the switchboard; stationary guiding pulleys arranged in line to one another in said frame; movable guiding pulleys, each connected to one of the push buttons, respectively, said movable guiding pulleys being arranged in line to one another in the same plane with said stationary guiding pulleys; a flexible cord connected with one end thereof to said frame and arranged in a zig-zag path embracing said guiding pulleys; and a rotatable drum adapted to take a plurality of positions for controlling connections between the lines and being connected to the other end of said flexible cord, whereby by the pushing in of a push button said movable pulley connected therewith is displaced and the effective length of said flexible cord is increased so that said drum changes the position thereof.

7. A telephone switchboard having a plurality of push buttons arranged in horizontal rows and vertical columns for making connections between lines, comprising in combination, a frame rigidly secured to the switchboard; stationary guiding pulleys arranged in a horizontal row in said frame; movable guiding pulleys, each connected to one of the push buttons arranged in a horizontal row, respectively, said movable guiding pulleys being arranged in a horizontal row in the same plane with said stationary guiding pulleys; a flexible cord connected with one end thereof to said frame and arranged in a zig-zag path embracing said guiding pulleys; and a rotatable drum adapted to take a plurality of positions for controlling connections between the lines and being connected to the other end of said flexible cord, whereby by the pushing in of a push button said movable pulley connected therewith is displaced and the effective length of said flexible cord is increased so that said drum changes the position thereof.

8. A telephone switchboard having a plurality of push buttons arranged in horizontal rows and vertical columns for making connections between lines, comprising in combination, a frame rigidly secured to the switchboard; stationary guiding pulleys arranged in a vertical column in said frame; movable guiding pulleys, each connected to one of the push buttons arranged in a vertical column, respectively, said movable guiding pulleys being arranged in a vertical column in the same plane with said stationary guiding pulleys; a flexible cord connected with one end thereof to said frame and arranged in a zig-zag path embracing said guiding pulleys; and a rotatable drum adapted to take a plurality of positions for controlling connections between the lines and being connected to the other end of said flexible cord, whereby by the pushing in of a push button said movable pulley connected therewith is displaced and the effective length of said flexible cord is increased so that said drum changes the position thereof.

9. A telephone switchboard having a plurality of push buttons arranged in horizontal rows and vertical columns for making connections between lines, comprising in combination, a frame rigidly secured to the switchboard; first stationary guiding pulleys arranged in a horizontal row in said frame; first movable guiding pulleys, each connected to one of the push buttons arranged in a horizontal row, respectively, said first movable guiding pulleys being arranged in a horizontal row in the same plane with said stationary guiding pulleys; a first flexible cord connected with one end thereof to said frame and arranged in a zig-zag path embracing said first guiding pulleys; a first rotatable drum adapted to take a plurality of positions for controlling connections between the lines and being connected to the other end of said first flexible cord; second stationary guiding pulleys arranged in a vertical column in said frame; second movable guiding pulleys, each connected to one of the push buttons arranged in a vertical column, respectively, said second movable guiding pulleys being arranged in a vertical column in the same plane with said second stationary guiding pulleys; a second flexible cord connected with one end thereof to said frame and arranged in a zig-zag path embracing said second guiding pulleys; and a second rotatable drum adapted to take a plurality of positions for controlling connections between the lines and being connected to the other end of said second flexible cord, whereby by the pushing in of a push button said movable pulleys connected therewith are displaced and the effective lengths of said flexible cords are increased so that said drums change the positions thereof, respectively.

10. A telephone switchboard having a plurality of push buttons arranged in horizontal rows and vertical columns for making connections between lines, comprising in combination, a frame rigidly secured to the switchboard; first stationary guiding pulleys arranged in a plurality of horizontal rows in said frame; first movable guiding pulleys, each connected to the push buttons, respectively, said first movable guiding pulleys being arranged in a plurality of horizontal rows in the same planes with said first stationary guiding pulleys, respectively; first flexible cords connected with one end thereof to said frame and arranged in a zig-zag path enbracing, respectively, said first guiding pulleys arranged in a horizontal row; first rotatable drums each being adapted to take a plurality of positions for controlling connections between the lines and being connected to the other end of said first flexible cords, respectively; second stationary guiding pulleys arranged in a plurality of vertical columns in said frame; second movable guiding pulleys, each connected to the push buttons, respectively, said second movable guiding pulleys being arranged in a plurality of vertical columns in the same planes with said second stationary guiding pulleys, respectively; second flexible cords connected with one end thereof to said frame and arranged in a zig-zag path embracing, respectively, said second guiding pulleys arranged in a vertical column; and second rotatable drums each being adapted to take a plurality of positions for controlling connections between the lines and being connected to the other end of said second flexible cords, respectively, whereby by the pushing in of a push button said two movable pulleys connected therewith are displaced and the effective lengths of said two flexible cords embracing said two movable pulleys, respectively, are increased so that said two rotatable drums connected to said two flexible cords, respectively, change the positions thereof, respectively.

11. A telephone switchboard having a plurality of push buttons arranged in horizontal rows and vertical columns for making connections between lines, comprising in combination, a frame rigidly secured to the switchboard; first stationary guiding pulleys arranged in a horizontal row in said frame; first movable guiding pulleys, each connected to one of the push buttons arranged in a horizontal row, respectively, said first movable guiding pulleys being arranged in a horizontal row in the same plane with said first stationary guiding pulleys; a first flexible cord connected with one end thereof to said frame and arranged in a zig-zag path embracing said first guiding pulleys; a first rotatable drum adapted to take a plurality of positions for controlling connections between the lines and being connected to the other end of said first flexible cord; second stationary guiding pulleys arranged in a vertical column in said frame; second movable guiding pulleys, each connected to one of the push buttons arranged in a vertical column, respectively, said second movable guiding pulleys being arranged in a vertical column in the same plane with said second stationary guiding pulleys; a second flexible cord connected with one end thereof to said frame and arranged in a zig-zag path embracing said second guiding pulleys; a second rotatable drum adapted to take a plurality of positions for controlling connections between the lines and being connected to the other end of said second flexible cord; and means connected to said drums for restoring said drums to predetermined positions against the action of said cords, respectively, whereby by the pushing in of a push button said movable pulleys connected therewith are displaced and the effective lengths of said flexible cords are increased so that said drums change the positions thereof, respectively.

12. A telephone switchboard having a plurality of push buttons arranged in horizontal rows and vertical columns for making connections between lines, comprising in combination, a frame rigidly secured to the switchboard; first stationary guiding pulleys arranged in a plurality of horizontal rows in said frame; first movable guiding pulleys, each connected to the push buttons, respectively, said first movable guiding pulleys being arranged in a plurality of horizontal rows in the same planes with said first stationary guiding pulleys, respectively; first flexible cords connected with one end thereof to said frame and arranged in a zig-zag path embracing, respectively, said first guiding pulleys arranged in a horizontal row; first rotatable drums each being adapted to take a plurality of positions for controlling connections between the lines and being connected to the other end of said first flexible cords, respectively; second stationary guiding pulleys arranged in a plurality of vertical columns in said frame; second movable guiding pulleys, each connected to the push buttons, respectively, said second movable guiding pulleys being arranged in a plurality of vertical columns in the same planes with said second stationary guiding pulleys, respectively; second flexible cords connected with one end thereof to said frame and arranged in a zig-zag path embracing, respectively, said second guiding pulleys arranged in a vertical column; second rotatable drums each being adapted to take a plurality of positions for controlling connections between the lines and being connected to the other end of said second flexible cords, respectively; and means connected to said drums for restoring said drums to predetermined positions against the action of said cords, respectively, whereby by the pushing in of a push button said two movable pulleys connected therewith are displaced and the effective lengths of said two flexible cords embracing said two movable pulleys, respectively, are increased so that said rotatable drums embracing said two movable pulleys, respectively, change the positions thereof, respectively.

LOUIS MICHA.

REFERENCES CITED

The following references are of record in the file of this patent:

UNITED STATES PATENTS

| Number | Name | Date |
|---|---|---|
| 592,503 | Vandevelde | Oct. 26, 1897 |
| 843,508 | White | Feb. 5, 1907 |
| 1,099,343 | Craft | June 9, 1914 |
| 1,139,972 | Henschel | May 18, 1915 |
| 1,306,829 | Mellinger | June 17, 1919 |
| 1,751,406 | Hultman | Mar. 18, 1930 |
| 2,052,059 | Sengebusch | Aug. 25, 1936 |
| 2,199,686 | Beyland | May 7, 1940 |
| 2,259,103 | Drake | Oct. 14, 1941 |
| 2,320,774 | Flynt | June 1, 1943 |
| 2,410,540 | Wight | Nov. 5, 1946 |